(12) United States Patent
Brennan

(10) Patent No.: US 7,540,916 B1
(45) Date of Patent: Jun. 2, 2009

(54) BIOSOLIDS AND FLY ASH COMPOSITION FOR USE IN SOIL CONDITIONING

(75) Inventor: Joseph E Brennan, Pottsville, PA (US)

(73) Assignee: American Green Corp., Gilberton, PA (US)

( * ) Notice: Subject to any disclaimer, the term of this patent is extended or adjusted under 35 U.S.C. 154(b) by 532 days.

(21) Appl. No.: 11/059,583

(22) Filed: Feb. 16, 2005

Related U.S. Application Data

(60) Provisional application No. 60/546,070, filed on Feb. 19, 2004.

(51) Int. Cl.
*C04B 18/06* (2006.01)
(52) U.S. Cl. .......... 106/900; 106/DIG. 1; 264/DIG. 49
(58) Field of Classification Search ............ 106/DIG. 1, 106/705, 900; 264/DIG. 49
See application file for complete search history.

(56) References Cited

U.S. PATENT DOCUMENTS

| | | | | |
|---|---|---|---|---|
| 4,028,130 | A | | 6/1977 | Webster et al. ............ 106/120 |
| 4,306,978 | A | | 12/1981 | Wurtz ........................ 210/750 |
| 4,364,822 | A | | 12/1982 | Rich, Jr. ........................ 209/3 |
| 4,514,307 | A | * | 4/1985 | Chestnut et al. ............ 210/751 |
| 4,554,002 | A | * | 11/1985 | Nicholson .................... 71/12 |
| 4,615,809 | A | * | 10/1986 | King .......................... 210/751 |
| 4,902,431 | A | | 2/1990 | Nicholson et al. .......... 210/751 |
| 5,051,031 | A | * | 9/1991 | Schumaacher et al. ...... 405/129 |
| 5,143,481 | A | * | 9/1992 | Schumacher et al. ........ 405/129 |
| 5,454,849 | A | | 10/1995 | Rehbein et al. ................ 71/12 |
| 6,042,305 | A | * | 3/2000 | Novich et al. ............... 405/266 |

OTHER PUBLICATIONS

"Effects of Soil Amendments at Heavy Loading Rate Associated with Cover Crops as Green Manures on the Leaching of Nutrients and Heavy Metals from a Calcareous Soil", Wang et al. Journal of Environmental Science and Health, Part B Pesticides, Food Contaminants, and Agricultural Wastes, vol. B36, No. 6, pp. 865-881, (2003).*
"Bermudagrass Sod Growth and Metal Uptake in Coal Combustion By Product Amended Media", Schlossberg et al., Dept of Crop and Soil Sciences Building Athens GA, Received Mar. 20, 2003. Also published in J Env Qual 33:740-748 (2004).*
"Formulation ofo Environmentally Sound Waste Mixtures for Land Application", Schumann et al. Paper received Mar. 2003 and Accepted Aug. 2003; also printed in Water Soil and Air Pollution 152: 195-217, (2004).*
Answer 5 of 15 of CA on STN "Mine Soil Remediation using coal ash and compost mixtures", Sloan et al. , Proceedings of the Symposium Chemistry of Trace elements in Fly Ash , at the 6th Int'l Conference on the Biogeochemistry of Trace Elements), Guelph Ontario, Canada, Jul. 29-Aug. 2, 2001 (2003), Meeting date 2001, 309-318.*
Answer 6 of 15 of STN on Chem Abstracts "Influence of coal/organic waste application on distribution of trace metals ini soil, plant, and water", Li et al. Chemistry of Trace Elements in Fly Ash (Proceedings of Symposium Chemistry of Trace Elements in fly ash at 6th Int'l Symposium Conf. On Biochem. of Trace Elements), 2001. abstract.*
Answer 7 of 15 of STN on CHem Abstracts "Restoration of drastically eroeded land using coal fly ash and poultry biosolid", Punshon et al., Science of the Total Environment (2002), 296(1-3) 209-225. abstract.*
Answer 12 of 15 of CA on STN "Fly ash borne arsenic in soil plant system", Sumner et al., Proceedgs of Sp Session of Bigeochem of Trace Elmnts in Coal and Coal Combustion Byprdcts held during 4th Int'l Conf. on Biogeochem of trace elements, Meeting date 1997, 296-278. abstract.*
Answer 13 of15 of CA on STN "Plant nutrient availability from mixtures of fly ashes and biosolids", Schemann et al., Jrnl of Environm. Quality (1999), 28(5), 1651-1657. abstract.*

\* cited by examiner

*Primary Examiner*—Paul Marcantoni
(74) *Attorney, Agent, or Firm*—Howson & Howson LLP

(57) ABSTRACT

Biosolids and fly ash are mixed together in stated proportions, spread on soil, and tilled to provide a soil amendment that ameliorates off-gassing of noxious odors.

11 Claims, No Drawings

BIOSOLIDS AND FLY ASH COMPOSITION FOR USE IN SOIL CONDITIONING

CROSS REFERENCE TO RELATED APPLICATION

This application claims the benefit under 35 USC §119(e) of U.S. Provisional Application No. 60/546,070, filed Feb. 19, 2004.

BACKGROUND OF THE INVENTION

The present invention relates to a biosolids and fly ash composition used to condition soil while ameliorating off-gassing of noxious odors.

The disposal of biosolids or sewage sludge, has been a problem for many years. Various techniques have been proposed for disposing of the biosolids as an agricultural fertilizer. While this has certain advantages, the primary disadvantage is that the biosolids tends to off-gas noxious odors which renders this technique unacceptable in populated areas.

The stabilization of biosolids with fly ash has been proposed for use in cement products. U.S. Pat. No. 4,028,130 discloses a method of treating biosolids to form a stable particulate structure that can be deposited in landfills in an environmentally acceptable manner. Biosolids stabilization techniques suffer from the disadvantage of requiring equipment and energy to stabilize the biosolids before being carted off to a disposal site.

It has been known for a long time to use lime to disinfect and deodorize human waste. U.S. Pat. No. 4,902,431 states that this has been known since Roman times. The patent discloses the mixture of kiln dust with biosolids for use as an agricultural fertilizer. The patent notes that "lime stabilizations have the advantage of being low in cost and simple in operations; however, lime addition does not make sludges chemically stable. The patent states that if the pH drops below 11.0, biological decomposition will produce noxious odors.

U.S. Pat. No. 5,454,849 issued Oct. 3, 1995 discloses the mixture of two nuisance waste products, namely sewage sludge ash and water treatment lime for placement on agricultural soils to enhance the nutrient value of the soil and raise the pH for improving plant growth. The patent discloses the application of the mixture in liquid form onto the soil. The patent teaches the burning of the sewage sludge to form an ash which, in turn, is mixed with spent water treatment lime.

U.S. Pat. No. 4,306,978 discloses historical use of lime to treat nuisance conditions such as those resulting from open pit privies. The patent goes on further to note that prior to 1970, very little quantitative information and technical data were available on the reaction of lime with sludge for stabilization and disposal purposes. The patent cites an EPA study that "concludes that lime stabilization has been demonstrated to effectively eliminate odors, improve bacterial and pathogenic organism control, provide stable material for application of agricultural land, . . . ." In the patented process, sludge is dewatered to produce a sludge cake which is reacted with calcium oxide to produce stabilized sludge pellets.

U.S. Pat. No. 4,554,002 discloses the mixing of kiln dust with waste sludge to produce a disintegratable product which can be applied to land as a soil conditioner. The patent suggests the use of fly ash in "small quantities" to adjust the pH of the material. The patent states that the blending of kiln dust, a high lime product, with sludge, greatly reduces offensive odors at the treatment plant, in transit, and on the field.

BRIEF SUMMARY OF THE INVENTION

With the foregoing in mind, it is object of the present invention to provide a simple yet effective environmentally-friendly method for disposing of biosolids by combining it with fly ash in stated proportions and forming a soil conditioner particularly suited for use in land reclamation.

The present invention provides a soil amendment composition comprising about 80-85 percent biosolids and about 15-20 percent fly ash based on the combined weight of the composition, the biosolids fraction comprising about 70-75 percent moisture.

More specifically, the present invention provides an environmentally-acceptable method of conditioning soil for planting. The method comprises the steps of uniformly spreading the above composition of biosolids and fly ash in stated proportions on an area of soil at a predetermined rate, and subsequently deep tilling the thus-treated soil to ameliorate off-gassing of noxious odors.

DETAILED DESCRIPTION OF THE INVENTION

According to the preferred embodiment, Applicant has determined that by combining about 20 percent fly ash with about 80 percent of biosolids, based on the weight of the biosolids and fly ash combined mixture, the resulting composition does not off-gas noxious odors when deep tilled into soil. The biosolids are preferably initially pre-mixed with the fly ash, and the mixed composition spread uniformly on an area of soil at a rate in a range of about 285 to about 300 tons per acre of which the fly ash portion is in a range of about 45 to about 60 tons per acre, and the biosolids being about 240 tons per acre. Thereafter, the soil on which the biosolids and fly ash mixture has been applied is deep tilled to a depth ranging from about 6 inches to about one foot. The thus mixed biosolids, fly ash and soil has been found to limit the discharge of noxious odors into the ambient air, thereby providing an environmentally acceptable method of disposing of two waste products in an ecologically friendly manner.

Instead of spreading the biosolids and fly ash simultaneously, as preferred, it may be possible to spread the biosolids and fly ash sequentially onto the soil, and the fly ash biosolids combination deep tilled. The pre-mixed composition may be bagged and sold either with, or without, admixed soil for use in gardening.

By way of example, and not by way of limitation, Applicant provides the following test results of a preferred method and composition of the present invention.

From a so-named Ellangowen, Pa. D.E.P. approved, demonstration plot located in Mahanoy Township, Schuylkill County, Pa., two five (5) acre test plots were formed. One had applied on it 240 tons (2000 lb./ton) of sewage sludge, or biosolids, obtained from a water treatment plant located in Philadelphia, Pa., and 60 tons of fly ash obtained from the John Rich Memorial anthracite coal-fired co-generation plant located in Gilberton, Pa. The 240 tons of biosolids was admixed with the 60 tons of scrubbed fly ash prior to spreading on one plot and deep tilling into the soil. On the second companion plot, 240 tons of the biosolids was admixed with 45 tons of the fly ash prior to application and tilling. After tilling, no significant amount of noxious off-gases were detected by ordinary observers located contiguous to the plots.

The fly ash was the reaction product of the fluidized-bed combustion of Northeastern Pa. anthracite coal beneficiated from mine tailings of various veins in the vicinity of Gilberton, Pa., preferably in accordance with the method and apparatus disclosed in U.S. Pat. No. 4,364,822 granted to J. W. Rich, Jr. in 1982. The pulverized coal fuel had a carbon content of about 8 to about 10 percent, by weight, and a heating value of about 7000 B.T.U. per pound of dry weight.

During the fluidized-bed combustion, limestone is fed into the combustion chamber at a rate sufficient to react with the sulfur dioxide and other gases to produce a granular, fly ash composition having the consistency, appearance, and flowability of peach-colored sand. Prior to mixing with biosolids, the granular fly ash composition had a moisture content of less than about five percent (5%).

The pH of the fly ash was in the range of 10.6-10.8 (depending upon measurement method). The fly ash provided a calcium carbonate $CaCO_3$ equivalence of 33 tons of calcium carbonate to 1,000 tons of fly ash. The overall composition of the fly ash, the biosolids and the soil had a combined pH over about 7.0.

The biosolids used in the test was wet prior to being mixed in situ, with the aforedescribed fly ash. The biosolids contained about 70 percent, by weight, of water, and it had a pH of about 9.5. The biosolids were thick and not flowable, and did not ooze water when piled to a height of about 6 feet.

The test plot was characterized by the absence of topsoil and the presence of rocks up to about 6 inches in maximum dimension. The test plot was the result of a mine tailings surface reclamation effort. The soil had an average pH of 4.85. The soil was disturbed prior to spreading, but did not support any vegetation prior to spreading.

The test was conducted during the early Spring in 2003 under weather conditions that were cooler than usual and wetter than usual.

The biosolids and fly ash were mixed together with a front end loader to form a composition in the stated proportions. They were then loaded into a Terra-gator™ spreader manufactured by Ag-Chem of Apple Valley, Minn. which further mixed the composition as it was centrifugally discharged from the rear of the spreader as it advanced across the soil. The composition was applied at a uniform depth of slightly less than two (2) inches, but greater than about 1.5 inches, resulting in a biosolids/fly ash/soil composition containing from about 15% to about 35% by volume, of the soil amendment.

After the composition was spread, it was promptly (i.e. within the same work day) deep-tilled into the soil by means of a heavy-duty disc implement having an array of discs arranged to slice the soil to a depth of at least six (6) inches, and preferably to a depth of 12 inches, and displace it laterally and upwardly. The disc implement was manufactured by Rome Industries of Cedartown, Ga. and was pulled by a bulldozer across the test plot in a minimum of three (3) parallel passes, and at least once in a cross-direction.

The test plots were subsequently hydro-seeded with a mix of annual and perennial gasses of warm season and cold season variety, about ⅓ being of warm season varieties and the balance being cold season varieties. By late summer 2003, the test plots exhibited vigorous growth with well-established grass root systems and the continued absence of any noxious odors.

Although the precise mechanism by which the invention functions to ameliorate odors cannot be fully explained, it is believed that the pH of the composition is not acting to inactivate or pasteurize microorganisms in the sewage sludge. It is believed, but not yet proven definitively, that the specified fly ash is adsorbing odorous compounds and reacting those compounds (e.g. methanethiol and dimethyl sulfide) to break them into non-odorous components. The mineral matter of the ash imparts a soil-like property to the composition, thereby reducing moisture content, improving workability and tractability of the composition. It is possible some of the beneficial results achieved with the fly ash of the preferred embodiment may have been aided by the $CaCO_3$ that resulted from the limestone required in the combustion of the fuel.

The invention claimed is:

1. A method of conditioning soil for land reclamation in populated regions with biosolids in a manner ameliorating off-gassing of noxious odors, comprising the steps of:
   obtaining particulate fly ash produced as a reaction by-product of fluidized-bed combustion of anthracite coal in the presence of pulverized limestone, the particulate fly ash having a moisture content of less than about 5% and a pH within a range of about 10.6 to 10.8;
   obtaining biosolids having a solids content of about 25% to 30% by weight and a moisture content of about 70% to 75% by weight;
   preparing a soil amendment composition consisting essentially of about 80 to about 85 percent by weight of said biosolids and about 15 to about 20 percent by weight of said particulate fly ash;
   pre-mixing said soil amendment composition in a front end loader;
   after said pre-mixing step, loading said soil amendment composition in a spreader;
   further mixing and uniformly spreading said soil amendment composition with said spreader on a surface of land unable to support vegetation by centrifugally discharging said soil amendment composition from said spreader to a depth of less than about 2 inches but greater than about 1.5 inches on the land; and
   after said discharging step, further mixing said soil amendment composition by tilling said soil amendment composition into the pre-existing soil of the land to a depth of at least about 6 inches;
   whereby said method provides beneficial use of biosolids and fly ash waste products in an ecologically-friendly manner that limits the discharge of noxious odors into the atmosphere enabling land reclamation in populated regions.

2. A method according to claim 1, wherein, during said spreading step, said soil amendment composition is spread uniformly at a rate in a range of about 285 to about 300 tons per acre.

3. A method according to claim 2, wherein, after said tilling step, said soil amendment composition comprises about 15% to 35% by volume of a surface layer of soil of the land, wherein said surface layer of soil has a pH of over about 7, and wherein said surface layer of soil supports vigorous growth of grasses for land reclamation.

4. A method according to claim 3, wherein, during said spreading step, said soil amendment composition is spread on pre-existing soil that is characterized by an absence of topsoil and the presence of rocks, and said land reclamation is a mine surface reclamation.

5. A method according to claim 4, wherein, during said tilling step, said soil amendment composition is tilled into the pre-existing soil to a depth of 12 inches.

6. A method according to claim 5, wherein, a disc implement having an array of discs that slice the soil and laterally and upwardly displace the soil is used to accomplish said tilling step, said disc implement making a minimum of three parallel passes and at least one cross-direction pass over the land being reclaimed.

7. A method according to claim 4, wherein said particulate fly ash provides a calcium carbonate equivalence of 33 tons of calcium carbonate to 1,000 tons of said fly ash.

8. A method according to claim 7, wherein, before said pre-mixing step, said biosolids is thick and non-flowable and does not ooze water when piled to a height of about 6 feet, and wherein said biosolids has a pH of about 9.5.

9. A method of mine surface reclamation in a populated region in a manner ameliorating off-gassing of noxious odors, comprising the steps of:

obtaining particulate fly ash produced as a reaction by-product of fluidized-bed combustion of anthracite coal in the presence of pulverized limestone, the particulate fly ash having a moisture content of less than about 5%, a pH within a range of about 10.6 to 10.8, and a calcium carbonate equivalence of 33 tons of calcium carbonate to 1,000 tons of said fly ash;

obtaining biosolids having a solids content of about 25% to 30% by weight and a moisture content of about 70% to 75% by weight;

preparing a soil amendment composition consisting of about 80 to about 85 percent by weight of said biosolids and about 15 to about 20 percent by weight of said particulate fly ash;

pre-mixing said soil amendment composition in a front end loader;

after said pre-mixing step, loading said soil amendment composition in a spreader;

further mixing and uniformly spreading said soil amendment composition with the spreader at a rate in a range of about 285 to about 300 tons per acre on a surface of land unable to support vegetation by centrifugally discharging said soil amendment composition from the spreader to a depth of less than about 2 inches but greater than about 1.5 inches on the land;

after said discharging step, tilling said soil amendment composition into the pre-existing soil of the land to a depth of about 12 inches with a disc implement having an array of discs that slice the soil and laterally and upwardly displace the soil;

after said tilling step, said soil amendment composition comprising about 15% to 35% by volume of a surface layer of soil of the land, said surface layer of soil having a pH of over 7, being able to support vigorous growth of grasses, and ameliorating off-gassing of noxious odors; and after said tilling step, hydro-seeding the surface layer with grasses.

10. A method according to claim 9, wherein the fluidized-bed combustion from which said fly ash is produced as a by-product uses pulverized anthracite coal having a carbon content of about 8 to 10%.

11. A method according to claim 10, wherein the fluidized-bed combustion from which said fly ash is produced as a by-product uses pulverized anthracite coal having a heating value of about 7000 B.T.U. per pound of dry weight.

* * * * *